April 2, 1968  G. C. HOWARD ET AL  3,375,856
PIPELINE ASSEMBLY FOR UNDERWATER
Filed May 26, 1965
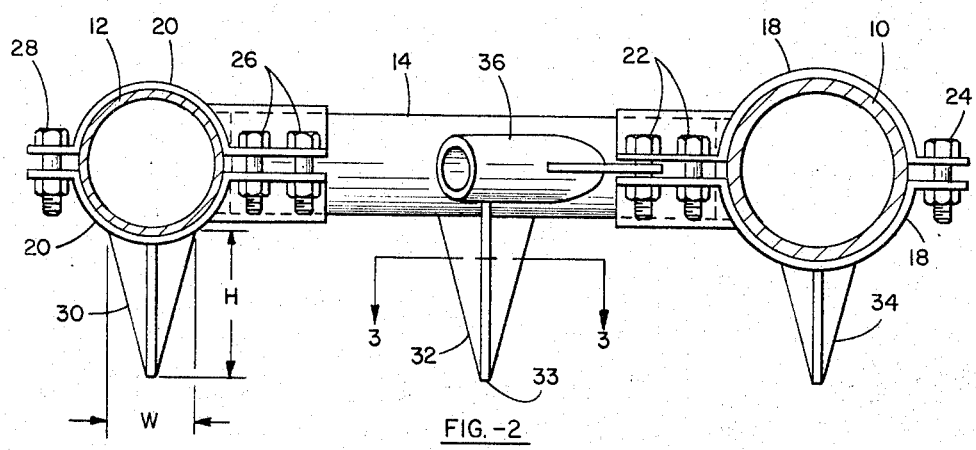
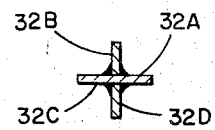
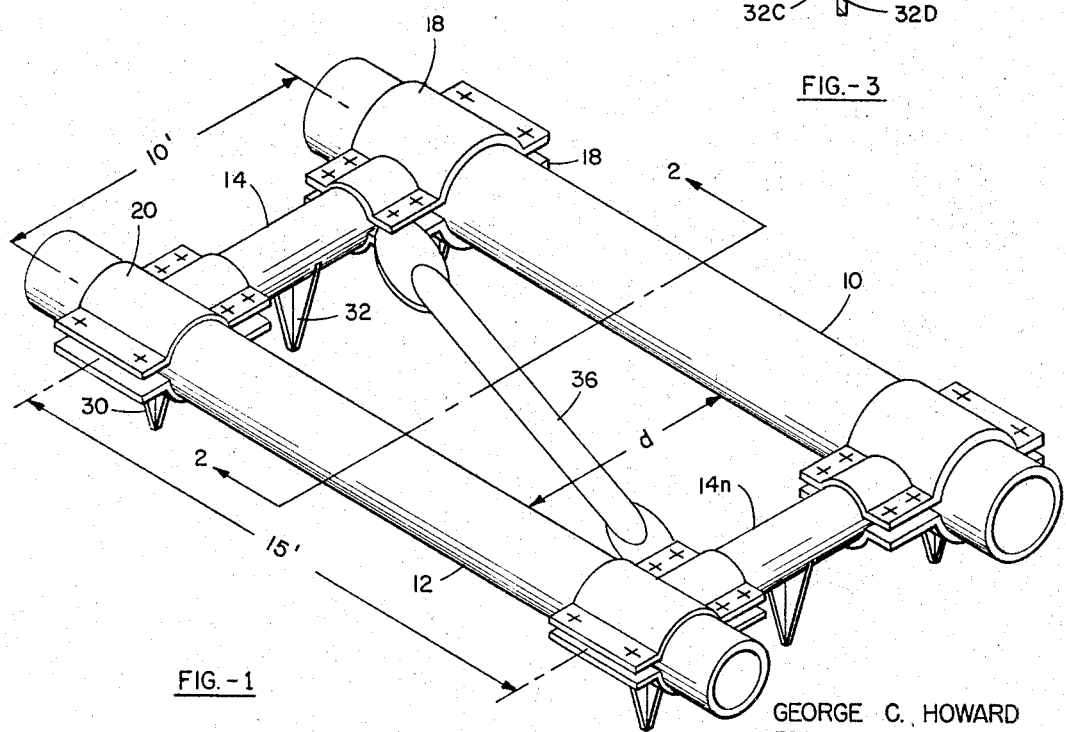
GEORGE C. HOWARD
RENIC P. VINCENT
*INVENTORS.*
BY *John D. Gassett*
ATTORNEY.

United States Patent Office 3,375,856
Patented Apr. 2, 1968

3,375,856
PIPELINE ASSEMBLY FOR UNDERWATER
George C. Howard and Renic P. Vincent, Tulsa, Okla., assignors to Pan American Petroleum Corporation, Tulsa, Okla., a corporation of Delaware
Filed May 26, 1965, Ser. No. 458,994
3 Claims. (Cl. 138—106)

ABSTRACT OF THE DISCLOSURE

A horizontally disposed twin pipeline system for use in turbulent water. Two horizontal pipes are assembled in a common horizontal plane. The pipes are held a fixed distance apart by cross braces. The cross brace under each pipe is provided with a special anchoring system for anchoring the pipe assembly to the floor of a body of water. Each of the pipes is for carrying oil from a well to a shore terminal.

---

This invention relates to underwater pipelines. It relates especially to pipeline assemblies for use in turbulent water.

In recent years the activity of drilling oil and gas wells in marine locations has greatly increased. Many such wells are drilled in water ranging in depth from a few feet to 300 to 500 feet or more. In some of these areas, such as the Cook Inlet in Alaska, the underwater currents are of great force and frequently change direction, resulting in very turbulent conditions.

In many marine areas having petroleum wells it has been found desirable to transport the oil from the wells to shore through pipelines. These pipelines are normally laid on the bed underlying the body of water. The laying of underwater pipelines normally includes the use of a floating barge or vessel which carries many lengths of pipe which are welded together into a long string. The pipe is X-rayed, tested for leaks, and wrapped to prevent corrosion and abrasion. The pipe is then let off the rear of the barge as the barge moves toward the pipeline terminal. As the pipeline is lowered into the water it forms a catenary which is primarily a function of the depth of the water. Many articles have been written on the determination of the catenary and of laying pipe in this manner. The laying of underwater pipe still has some problems. However, the laying of the pipe is not now the source of primary concern. The primary concern is to maintain the pipeline in a relatively fixed position on the bottom underlying the water after it has been laid. This is an especially difficult problem in turbulent water or water moving with a substantial current velocity. The strong currents tend to sweep the pipeline from its original location. Sometimes the pipeline is rolled or twisted and if the movement is sufficiently great or repeated frequently, the pipe may fail. Thus, it is seen that maintaining a pipeline in its original location is a very important matter. Various means have been used in an effort to accomplish this. For example, many underwater pipelines have been buried; this is accomplished by digging a trench along the path of the pipeline in the bed below the body of water. The pipeline is laid in this trench and covered. This method is fairly satisfactory in some areas, however, it does have serious drawbacks. For example, trenching is a very costly operation and is frequently not at all economical in water deeper than about 15 to 20 feet. Further, movement of the bottom may occur which exposes buried portions of the line, thus exposing it to possible movement.

Another method which has been used for maintaining pipe in position is to provide the pipeline with a coffin-shaped concrete coating. This system has met with some success but it too has certain handicaps or drawbacks in that the concrete coffin is quite expensive and adds considerable weight to the pipe which must be laid and poses additional possibility of pipe breakage during laying due to difficulty in maintaining the proper catenary in the pipe.

It is thus seen that there are important problems still remaining in maintaining underwater pipelines in fixed positions, especially in turbulent water. The present invention provides a novel means of a pipeline assembly or combination which is designed to prevent pipeline movement. The assembly includes two parallel strings of pipe. The parallel strings of pipe are maintained a suitable distance apart, such as six to ten feet, for example. The spacing is maintained by cross members or pieces which are connected at frequent intervals (for example, every 15 feet) to the parallel strings of pipe by clamps or other means, such as welding. The cross pieces are equipped with spade-type spikes extending downward from the bottom of the clamps which attaches the end members of the cross pieces to the two pipes. By using two lines spaced a fixed distance apart, the anchoring spikes can be accurately oriented so that they can penetrate the bottom. Each of the pipes is for carrying oil from the well to a shore terminal. The cross pieces are of sufficient strength to add the desired rigidity to the assembly. This rigidity aids in preventing twisting or rolling of the pipe. The spike-like members are forced into the bottom of the bed by the weight of the pipe and anchors the pipe system. This prevents lateral movement of the pipeline.

It is thus seen that it is an object of this invention to provide a pipeline system that resists twisting and rolling in turbulent waters and one that is anchored to the bottom of the body of water. Various other objects and a better understanding of the invention can be had from the following description taken in conjunction with the drawings in which:

FIGURE 1 illustrates a perspective view of a section of a pipeline system assembled in accordance with this invention;

FIGURE 2 illustrates a section along the lines 2—2 of FIGURE 1; and

FIGURE 3 illustrates a section along the lines 3—3 of FIGURE 2.

Attention is now directed toward FIGURE 1 in which is illustrated a preferred embodiment of this invention. Shown thereon are a first string of pipe 10 and a second string of pipe 12. These pipe strings are normally made of steel and are provided protection against corrosion. These strings of pipe are held in substantial fixed parallel relationship by cross members 14 and 14n. These cross members are attached to the pipes 10 and 12 and are spaced along the length thereof. As shown in FIGURE 2, cross member 14 is connected to pipe 10 by clamps 18 and 20. These clamps are secured together and to cross member 14 by bolts 22 and 24. Cross member 14 is held to pipe 12 by upper and lower clamp members 20 and 20' secured by bolts 28 and 26. Other cross members 14n are similarly connected to pipes 10 and 12. Cross members 14 and 14n are of sufficient length to form a rigid configuration with the strings of pipe to prevent or impede the rolling of one pipe over the other. Suitable lengths of the cross members are normally preferred to be such as to maintain the parallel pipe strings about six to about ten feet apart. The cross members are spaced at intervals of about 15 to 100 feet along the length of pipes 10 and 12. As we have said, the assembly is supported from or anchored to the floor of the body of water at each cross member. The spacing is designed to assure reasonable stress levels for the load imposed on the line by the current. The stress in members 10 and 12 can be determined by use of well-known continuous beam formulas, for example in which spaced points are supported and the load is uniformly distributed along the length of the beam. For a discussion of such formulas, reference is made to page 396, Machinery Handbook, 16th edition, published by the Industrial Press, New York, New York. Although this invention is not limited by or to a specific formula, this method can be used to fix the distance between cross members for a given set of conditions in relation to the stress on the pipe lines 10 and 12. Generally speaking, however, desired rigidity of the piping system largely determines the spacing of the cross members; the smaller the interval, the more rigid the system.

The cross member 14 can be a tubular material filled with a weighting material, such as gravel or cement. This decreases the buoyancy of the system.

As shown in FIGURE 2, spade-like spikes are provided on the underneath side of each cross member and underneath each clamp member. As shown, this includes stabilizer spades 30, 32, and 34. A cross section of the preferred form of spade-like spike 32 is shown in FIGURE 3. It shows that there are stabilizing vanes of fins 32A, 32B, 32C, and 32D, spaced 90 degrees apart. The vanes are triangularly shaped with the outer edge slightly curved and come to a point or knife edge 33 at the lower end of the spike. When these spikes are driven into the ground by the weight of the pipe, the stabilizer vanes resist movement both in the longitudinal direction and lateral direction of the pipe.

The stabilizer spikes 30, 32, and 34 also prevent the pipes from being twisted or rotated by turbulent currents. For example, pipe 10 cannot rotate about pipe 12 as a pivot axis because spikes 30, 32, and 34 are embedded into the ground. Such motion is resisted by stabilizer vanes 32b and 32d on each such spike.

Another problem which underwater pipelines frequently encounter is that the turbulent current removes soil or solids from beneath the pipelines. This can have two disastrous effects: (1) It subjects more area of the pipe to the forces of the current; and (2) if the soil is removed for too great a distance along the length of the pipe, too great a portion of the pipe is unsupported resulting in pipe sagging and subsequent possible failure. In the instant invention the spikes continue to support the pipe although the soil beneath the pipe is removed. The length of the spikes 30, 32, and 34 should be greater than the depth which experience may teach in an area is the depth that such removal of solids may occur by the turbulent currents. In a preferred embodiment, the length, height H of the spikes would normally be from about two to about ten feet. A preferred width W of the base, or upper portion of the spikes, and as shown in FIGURE 2, is from one to about three feet. Normally, the width W is approximately the same as the diameter of the pipe 10.

In the event that the bottom of the body of water is irregular so that the spikes do not contact the bottom for some distance, the stress in the pipes may become excessive. In such cases, diagonal braces 36 can be used to increase the strength of the assembly. Although our invention is not limited to a particular formula, in this case with brace 36, the stress in the pipes 10 and 12 arising from current loads on the unsupported section can be determined if the length of the span is known. In this regard, the maximum stress is given by $$S = \frac{M/d}{A}$$

where $$M = \frac{WL^2}{24}$$

where M is the moment at the ends of the suspended section, d is the distance separating the pipes 10 and 12, L is the length of the span, and A is the cross-sectional area pipe 10 or 12.

The laying of the system of this invention can readily be accomplished in a conventional manner. For example, it is preferred that the system be assembled on a ship and slid off its stern as it progresses toward the location of the pipeline terminal. Each string of pipe 10 and 12 is formed by welding short sections together, X-raying each section, testing the welds and wrapping as in a conventional system for protection against corrosion and abrasion. The cross members, with spike or anchor means, are attached at the proper interval and the pipe slid into the water. As the pipe settles in the water it forms a catenary which is largely dependent upon the depth of the water. That part of the pipe which is on bottom is firmly anchored by spikes 34 sinking into the bottom of the bed and thus holds that part of the dual line already on bottom in position. If the catenary is of considerable length, which may be the case in water 100 feet or more in depth, small tugs are provided to prevent the pipe system from being washed down current.

If the currents are such that it appears that flutter is a problem, two different sizes of pipes can be used. Flutter might occur under certain circumstances of current, wave, and tide action if pipes 10 and 12 were approximately equally balanced in weight. This vibration or flutter can be restricted or arrested by making pipes 10 and 12 of different sizes.

While there are disclosed above a limited number of illustrations of this invention, various modifications can be made thereto without departing from the spirit and scope of the invention.

We claim:
1. A pipeline assembly for transporting fluid along the bottom of a water-covered bed which comprises:
   a first tubular member;
   a second tubular member;
   a plurality of rigid cross members holding said first and said second tubular members in a spaced-apart relationship, said cross members being spaced along the length of said tubular members;
   spike means fastened to said rigid cross members directly under and along said first tubular member and said second tubular member, said spike means being approximately the same length and adapted to penetrate the bottom of said water-covered bed.

2. An assembly as defined in claim 1 in which there are only a first tubular member and a second tubular member and in which one of said tubular members has a diameter greater than the other so as to restrict the tendency to flutter.

3. An assembly as defined in claim 1 in which said spike means includes radially spaced vertically oriented triangularly shaped vanes arranged to come to a common point at the lower end.

References Cited

UNITED STATES PATENTS

| | | | |
|---|---|---|---|
| 535,809 | 3/1895 | Blanchard | 61—10 |
| 2,238,427 | 4/1941 | Schmid | 138—111 |
| 2,736,334 | 2/1956 | Riley | 137—336 |
| 3,086,369 | 4/1963 | Brown | 61—72.3 |
| 3,136,133 | 6/1964 | Perret | 61—72.3 |
| 3,176,773 | 4/1965 | Headrick | 137—736 X |
| 3,214,921 | 11/1965 | Goepfert | 61—72.3 |
| 2,765,135 | 10/1956 | Chellis | 248—68 XR |

WILLIAM F. O'DEA, *Primary Examiner.*

H. W. WEAKLEY, *Assistant Examiner.*